May 12, 1970        N. N. DOLGOPOLOV        3,511,366
ELECTRIC SEPARATOR FOR THE SEPARATION OF LOOSE MATERIALS
ACCORDING TO THEIR SIZE AND COMPOSITION
Filed Sept. 12, 1966
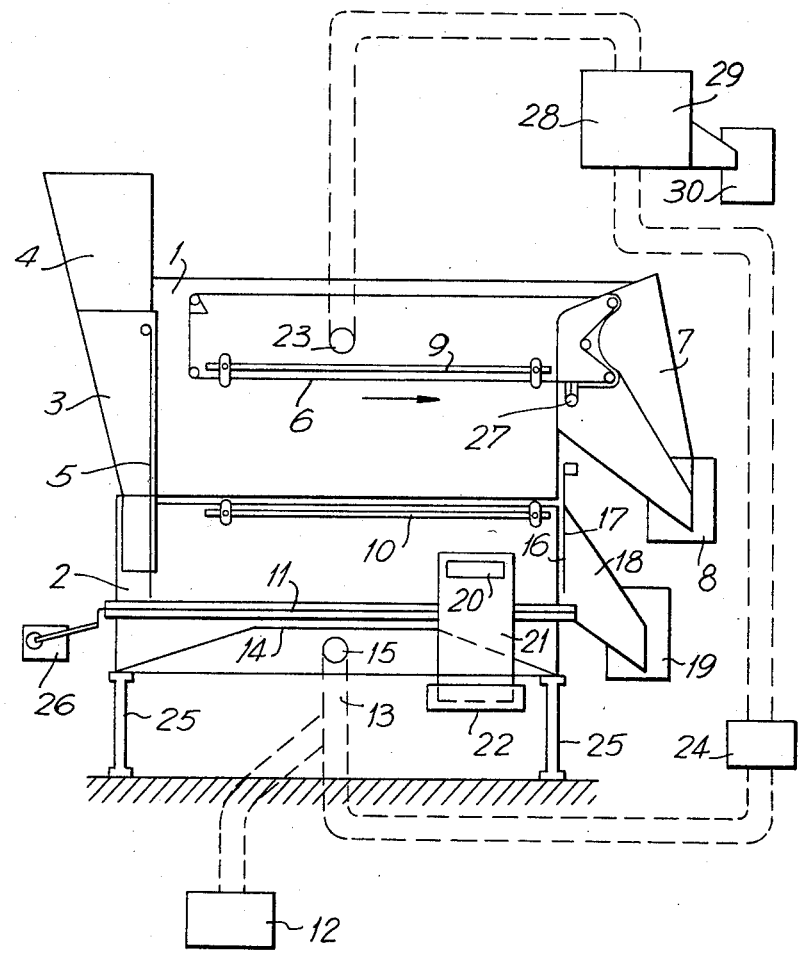

United States Patent Office 3,511,366
Patented May 12, 1970

3,511,366
ELECTRIC SEPARATOR FOR THE SEPARATION OF LOOSE MATERIALS ACCORDING TO THEIR SIZE AND COMPOSITION
Nifont Nikolaevich Dolgopolov, 1 Spasonalivkovsky per., 12, kv. 12, Moscow, U.S.S.R.
Filed Sept. 12, 1966, Ser. No. 578,674
Claims priority, application U.S.S.R., Oct. 29, 1965, 1,033,632
Int. Cl. B07b 9/02; B03c 7/04
U.S. Cl. 209—12     4 Claims

ABSTRACT OF THE DISCLOSURE

An electrical separator for the classification of loose materials as to size and composition, in which the material to be classified is introduced into an enclosed working space in which a pressure gas is supplied to produce in the lower portion of the working space a fluidized layer of the material being separated. Electrodes are disposed in the working space to provide an electrical field of corona discharge, and a porous belt of a dielectric material passes between the electrodes to receive and discharge product being separated. A suction device is connected to the working space at a level above the belt to remove expended gas together with fine fractions of loose material passing through the belt. The fine fractions are recovered externally of the working space and the gas is recycled back into the working space together with fresh pressure gas.

---

The present invention relates to electrical separators for the separation of loose materials according to their size and composition.

More specifically, the present invention relates to electric separators, in which the separation of an enriched material is effected due to a simultaneous action of an electric field, vibration and a gas, preferably compressed air, maintaining the material in a suspended state, thereby creating a pseudofluid layer.

Known at present are electric separators, having in the upper and lower portions of the working space electrodes, between which there is induced an electrostatic field, while the bottom of these separators is formed by a porous partition wall, through which into the working space, subjected to vibration, is supplied a gas under a pressure so as to provide a pseudofluid layer of the material being separated over the porous partition wall. The separated product is removed by a stream of used gas.

Disadvantages of separators employing the electrostatic field is their low productive capacity and an insufficiently distinct separation of finely dispersed products, for example, those having a particle size less than 150 microns.

This is explained by a low capacity of the electrostatic field, produced in the working space of the separator, to charge particles, as well as by the difficulties, connected with the control of the system for taking off the separation products, brought about by the absence of gas recirculation.

Said disadvantages have been at least partially eliminated in separators with an electric field of corona discharges. Separators of this type, however, do not provide a sufficiently distinct separation of finely dispersed products, because in this case the separation products are taken off by streams of gas which are supplied through the separator working space.

There are also known separators employing an electrostatic field, in which the separation products are removed by a continuous movable belt of a dielectric material, which is provided over the working space and embraces a grounded electrode. The separation products after having been deposited on said belt, are removed thereon from the working space. In this variant of the embodiment, however, the separators have but a low output, and separate the finely dispersed products in an insufficiently distinct manner.

An object of the present invention is to eliminate the above-mentioned disadvantages.

This object is accomplished due to the application of a combination of the above means, which enables construction of an electrical seperator of a considerably larger output, and to improve its seperating capacity both in respect to the particle size and composition; besides, such seperator permits separation of particles of small size.

According to the present invention, in the separator working space subject to vibration, in which there is provided an electric field of corona discharges, there is provided a continuous moving belt of a dielectric material embracing a grounded electrode, while the separator working space itself is in its upper portion connected to a suction device.

It is expedient to place a means for collecting finely dispersed fractions outside the working space and immediately before the suction device.

To decrease the losses of air and dustiness in the space surrounding the separator, the suction device is connected to a pump means, supplying gas (air) into the working space of the separator, which results in the formation of a recirculation system.

The details of the present invention will be made more fully apparent from a consideration of the following description of an exemplary embodiment thereof, taken in conjunction with the appended drawing, showing diagrammatically the separator of the invention.

The working space of the electric separator is formed by upper and lower bodies 1 and 2 with a bin 3 attached to them, said bin communicating with the lower portion of the seperator working space. The bin 3 is provided with a widening portion 4 to supply materials that are to be separated, and with a slide gate 5 to overlap a discharge hole of the bin 3.

The bodies 1 and 2, as well as the bin 3 with the slide gate 5 are made of a dielectric material, for example, Bakelite, wood, glass or plastic material.

The upper portion of the closed body 1 accommodates a continuous belt 6 of a dielectric material, for instance, cotton or synthetic cloth, or rubber, which is driven by a drive (not shown in the drawing). One end of the belt 6 protrudes from the body 1, and is arranged in a receiving hopper 7 of the separator, connected to a collecting tank 8.

A grounded electrode 9 is disposed over the lower branch of the belt 6. A corona electrode 10, disposed in the lower portion of the working space, may be imparted with a "plus" or "minus" electrical charge. Said corona electrode is constructed as a rectangular frame supporting taut pointed rods or thin wires.

The bottom of the body 2 is constituted as a porous partition wall 11, through which compressed air is supplied from below by a pump means 12 via a branch pipe 13. To provide for a uniform supply of compressed air over the entire surface area of the partition wall 11, there is provided beneath wall 11, a perforated distributor 14, while on the branch pipe 13 is disposed a slide gate 15 to control the volume of air supplied.

The partition wall 11 may be manufactured of cloth or non-glazed ceramics and other similar materials.

The body 2 is provided with a discharge outlet 16, over-lapped by a slide gate 17 of a receiving hopper 18 which is connected to a collecting tank 19, as well as with a discharge hole 20, opening into a receiving hopper 21 connected to a collecting tank 22.

The upper portion of the body 1 of the working space of the separator accommodates a branch pipe 23 to exhaust the dust-laden air, said branch pipe being connected to a suction device 24.

The electrical separator is mounted on an elastic base 25, or may be suspended on ropes. This is indispensable to impart vibrations to the electric separator by means of a vibrator 26.

The material to be separated passes from the bin 3 onto the porous partition wall 11, where it is subjected to a pseudoliquefaction under the action of the compressed air, supplied by the pump means 12. As a result of the vibration of the body 2 and the supplied air, there occurs the separation of the material as to its size in the same manner as the case with the existing separators with a "fluidized bed." Different in size, but comparatively coarser particles of the material are taken off by troughs of the hoppers 18, 21 into the collecting tanks 19, 22. The fine particles of the material are disposed in the upper zone of the pseudofluid layer, where it is most expedient to locate the electrode 10. Under the action of the electric field of the discharge between the electrodes 9 and 10, the fine particles are charged and pass through the charged electrode; then they deposit on the belt 6 and are transported thereof into the bin 7 and collecting tank 8.

The collection of the separation products from the belt 6 is effected either by a brush or scraper 27. In so far as the belt 6 is a netted structure, some amount of fine particles passes through it and penetrates into the branch pipe 23 together with the exhausted air.

It is expedient to connect the branch pipe 23 with a means 28 for collecting the fine fractions by providing it with a discharge hopper 29 and collecting tank 30. By the action of the suction means 24, the dust-free air goes into the pipe-line of the pump means, and further through the branch pipe 13 it again passes into the separator working space.

Thus, the separator so described can separate the material as to its size into four products, with two coarse fractions being taken off from the lower portion of the working space through outlet 16 and hole 20, while two fine fractions are removed by the belt 6 and recovered from the dust-laden air, flowing out through the branch pipe 23.

The proposed separator may be also employed to separate the material, not only according to the particle size, but also according to its composition. In this respect, the different composition of the material being separated will have different capacities of being charged electrically. Some constituents will be appreciably charged under the action of the electric field of the discharge of negative polarity, while other constituents under the action of that of positive polarity.

There are possible cases where separate constituents of the material will not be charged at all, and will not be removed from the pseudofluid layer by forces of the electric field.

Wherever required, conditions of the separator operations may be varied by controlling the intensity of the electric field between the electrodes, the polarity of the electrodes, the speed of the belt, the size of the net (meshes) of the belt, the volume of the air supplied, the rate of material supply, the speed of displacement of the pseudofluid material after its separation, the frequency of vibrations and their amplitude, etc.

In connection with the above-said, the proposed electric separator is of a universal type, that is its application enables carying out the separation according to the size of the material and the enrichment of various loose non-conducting materials. A very important advantage of said separator is its high output combined with minimum amount of metal structure.

As has been established by testing, an electrical separator with a surface area of the porous partition wall of 1 m.$^2$ has an output of more than 3 tons per hour (in terms of the product being supplied).

The testing of said electric separator with a number of materials has demonstrated its high operational efficiency. Thus, for example, from a sample of limestone of the size less than 150 microns there has been obtained the fraction of 43 microns containing coarser particles in an amount of 3 to 4 percent.

There are possible modifications of the proposed separator; for instance, the corona electrode may be made in a stepwise design, and may be disposed at various heights from the grounded electrode.

What is claimed is:

1. An electrical separator for the classification of loose materials as to their size and composition, said separator comprising means defining an enclosed working space, means for subjecting the working space to vibration; means for supplying material to be classified to said working space; a porous partition wall disposed in the lower portion of said working space; means for supplying a pressure gas into said working space and through said partition wall to produce in the lower portion of said space a pseudofluid layer of the material being separated; an outlet from said working space for heavier separated fractions of the loose material; a corona electrode in said working space in the upper region of said pseudofluid layer; a grounded electrode in the upper portion of said working space, whereby there is provided an electric field of corona discharge between said grounded electrode and said corona electrode; a porous, continuous, moving belt of a dielectric material in part disposed in said working space, said belt including a length of run between said electrodes to receive and discharge lighter fractions of the material to be separated from said working space; gas outlet means connected to said working space in the upper portion thereof at a level above said belt whereby the gas is constrained to pass through said belt in passing to the gas outlet means; and suction means connected to said air outlet means to remove expended gas together with fine fractions of loose material passing through said belt.

2. A separator as claimed in claim 1 comprising means disposed externally of the working space and upstream of said suction device to recover the fine fractions of material discharged from said working space.

3. A separator as claimed in claim 1, wherein said means for supplying pressure gas into the working space comprises pump means to supply the gas under pressure, said pump means being coupled with said suction means whereby expended gas is recirculated to said working space.

4. A separator as claimed in claim 1 wherein said part of the porous belt in said space embraces said grounded electrode.

References Cited

UNITED STATES PATENTS

| | | | |
|---|---|---|---|
| 2,559,076 | 7/1951 | Johnson | 209—127 |
| 3,369,661 | 2/1968 | Bradshaw | 209—139 X |
| 3,401,795 | 9/1968 | Tauveron | 209—12 |
| 344,720 | 6/1886 | Carpenter | 209—131 |
| Re. 21,653 | 12/1940 | Bigelow | 209—131 |
| 2,889,042 | 6/1955 | Le Baron | 209—127 |
| 3,249,225 | 5/1966 | Stuetzer | 209—129 |
| 3,261,463 | 7/1966 | Eveson | 209—11 |
| 3,291,301 | 12/1966 | Brastad | 209—12 |

FOREIGN PATENTS

| | | |
|---|---|---|
| 849,928 | 9/1960 | Great Britain. |
| 143,744 | 4/1962 | Russia. |
| 71,913 | 3/1916 | Switzerland. |

FRANK W. LUTTER, Primary Examiner

U.S. Cl. X.R.

209—129, 466